Feb. 26, 1957     W. H. APPLETON ET AL     2,782,993
AUTOMATIC CONTROL SYSTEM WITH REMOTE ADJUSTMENT
Filed Dec. 13, 1945
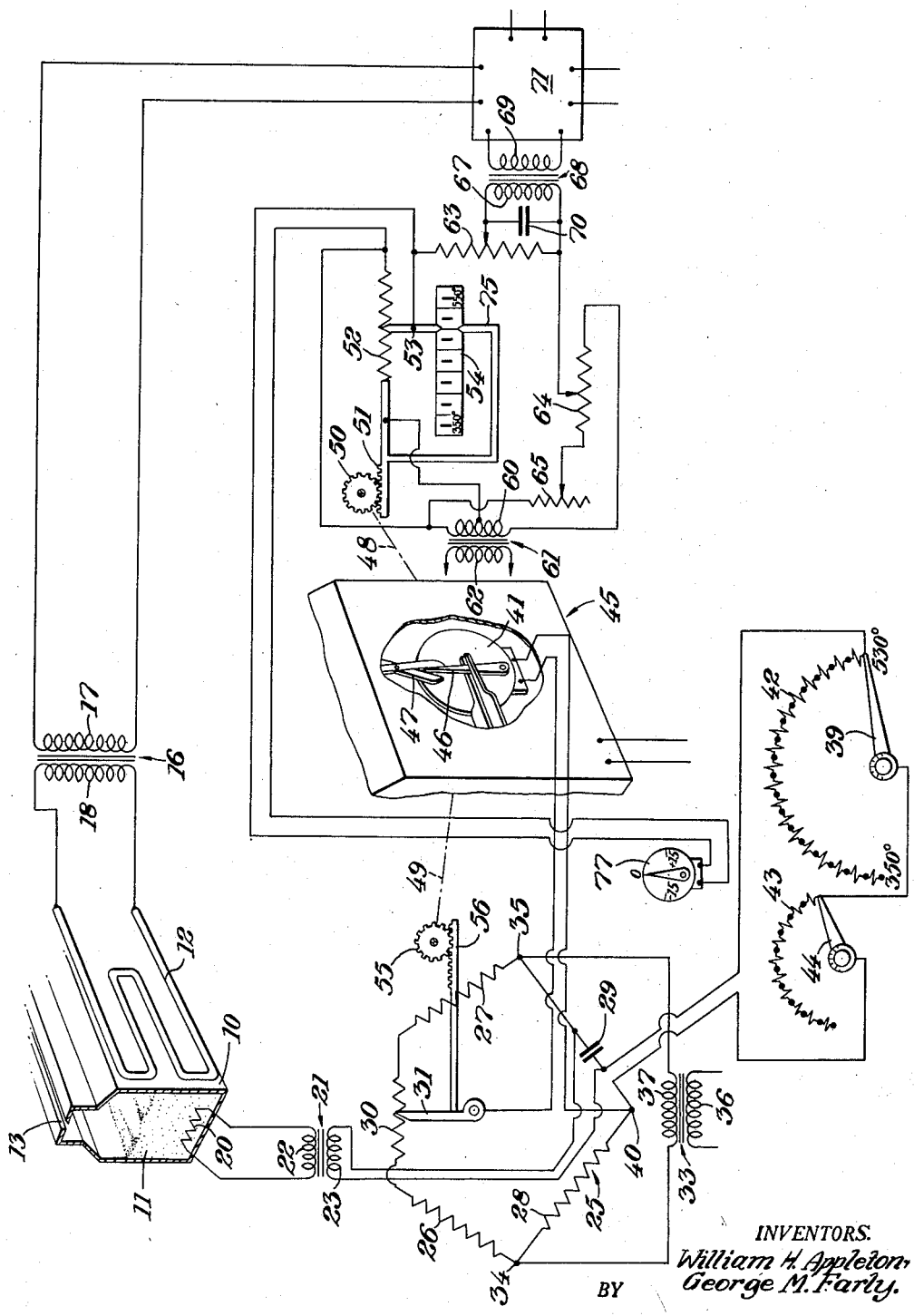
INVENTORS.
William H. Appleton,
George M. Farly.
BY
Robert A. [signature]

United States Patent Office 2,782,993
Patented Feb. 26, 1957

2,782,993

AUTOMATIC CONTROL SYSTEM WITH REMOTE ADJUSTMENT

William H. Appleton and George M. Farly, Berkeley, Calif., assignors to the United States of America as represented by the United States Atomic Energy Commission Application December 13, 1945, Serial No. 634,865

2 Claims. (Cl. 236—51)

This invention relates to automatic temperature control and is particularly concerned with improvements in arrangements for remote control and adjustment of the system and remote indication of the temperature.

Our invention is concerned primarily with types of systems wherein a bridge circuit is balanced and unbalanced in response to the temperature being controlled, and a potentiometer is adjusted in response to balance and unbalance of the bridge circuit for electrically controlling the input of heat to the region wherein the temperature is being controlled. In the particular control system in which our invention is an improvement, the control potentiometer has a slide wire resistance which is automatically adjusted in response to temperature variations. It has a cooperating slider which is manually adjustable to set for the temperature desired; the characteristics of the system are such that the temperature is normally stabilized at the desired set value with the slider at the mid-point of the slide wire. Our invention provides a manually adjustable resistance located at a remote point, the resistance being arranged to unbalance the bridge circuit for adjusting the temperature from the remote point, and our invention provides a voltmeter connected between one end of the slide wire resistance and the slider of the control potentiometer for indicating the relative positions thereof. The voltmeter has a range corresponding to the voltage drop across the slide wire of the control potentiometer, and therefore the voltmeter is at mid-scale when the slider is at the midpoint of the slide wire resistance, and the voltmeter deflects according to the amount the slider is off center, the amount of this deflection being the amount that the temperature is away from the desired setting. Thus, when adjustment in the temperature is to be made from the remote point the remote resistance is adjusted as described. This causes the slider to move away from center of the slidewire and to then move back toward center as the temperature starts toward the new setting; the amount it is off center is indicated by the voltmeter which is calibrated in degrees of temperature to right and left of mid-scale. When the voltmeter is back at mid-scale the temperature is at the new setting.

Reference is made to co-pending U. S. application No. 627,071, entitled Automatic Control Systems, filed November 6, 1945, in the name of K. G. MacLeish, for a description of a prior invention which is concerned with a similar problem and similar equipment.

The primary object of our invention is as elucidated in the foregoing, that is to adjust a temperature control system from a remote point by unbalancing a bridge circuit (for example) by means of a variable resistance and then indicating the amount of change with a voltmeter connected and calibrated as described.

Further objects and numerous advantages of our invention will become apparent from the following description and annexed drawing, the single figure of which is a diagrammatic representation of the temperature control system embodying our invention. The showing includes a wiring diagram of the circuits involved.

Referring to the drawing, numeral 10 shows in perspective a container or chamber in which a charge of solid material 11 may be vaporized by means of an electrical heating coil or resistance 12. The chamber 10 has a longitudinal slit-like opening or exit 13 in the upper part thereof. Heater 12 is supplied with power from a transformer 16 having a primary winding 17 and a secondary winding 18.

Our invention is primarily concerned with the control of the supply of electrical power to the heater 12. The control system provided is controlled in response to a hot wire resistance member 20 associated with the container 10, the member 20 being one which changes its impedance in accordance with its temperature. The resistance 20 is connected to the secondary of a transformer 21, the secondary winding being designated by numeral 22, and the transformer 21 having a primary winding 23. The primary winding 23 is associated with a bridge circuit 25 having resistances 26, 27, 28, and condenser 29 in its various legs and having a potentiometer comprising a slide wire resistance 30 and a slider 31. Winding 23 is connected across condenser 29. A power supply 33 is connected between opposite points 34 and 35, the power supply 33 comprising a transformer having a primary winding 36 and a secondary winding 37. The potentiometer comprised of slide wire resistance 30 and slider 31 is opposite point 40 of the bridge circuit and between this point 40 and the potentiometer slider 31 is connected a galvanometer 41. The leg of the bridge having condenser 29 therein also has in series therein the manually adjustable resistances 42 and 43 which are located at a remote point from the heating container 10. Resistance 42 has a slider 39 associated therewith and resistance 43 has a slider 44. These resistances are arranged in steps as shown, resistance 42 being graduated in degrees from 350° at one end to 530° at the other end, each step corresponding to a 10° change of temperature as will be described. Resistance 43 is arranged in ten steps each corresponding to a one degree change of temperature as will be described. With sliders 39 and 44 in the position shown no resistance is in series with condenser 29.

The leg of the bridge having condenser 29 therein is such that the bridge functions the same as if there were only resistance in this leg, the inductive reactance of winding 23 serves to balance the capacitive reactance of condenser 29, there being no phase change in this leg to interfere with balancing of the bridge.

The galvanometer 41 is a part of an instrument embodying a motor drive which provides for a mechanical response or responses whenever the galvanometer is unbalanced, the magnitude of the response or responses being proportional to the deflection of the galvanometer. The instrument 45 comprises a pair of jaws which are mechanically actuated so as to periodically at short intervals clamp the galvanometer needle 46 in whatever position the needle is in at the time. Numeral 47 designates a feeler mechanism somewhat on the order of a pair of scissors which is mechanically actuated to pinch the needle at periodic intervals in order to feel or sense the position of the needle. The feeler mechanism 47 controls a motor-driven apparatus which mechanically actuates shafts 48 and 49 in increments depending upon the amount that the galvanometer is off center. The mechanical movements of instrument 45 are of a type well known in the art, and since the instrument itself forms no part of our invention, it will not be described in further detail. The instrument 45 may be of the type known in the art and commercially as the Micromax manufactured by the Leeds & Northrup Company.

The shaft 48 actuates a pinion gear 50 associated with a rack 51 which operates to move a slide wire resistance 52 back and forth in accordance with the actuation of the shaft 48. Adjacent the slide wire resistance 52 is a manually adjustable slider 53 which has a lower part forming a pointer movable adjacent a graduated temperature scale 54.

The shaft 49 drives a pinion gear 55 associated with a rack 56 which is arranged to actuate the slider 31 relative to the slide wire resistance 30, the slider 31 being moved back and forth depending upon the magnitude and direction of unbalance of the galvanometer 41.

The slide wire resistance 52 is directly connected across the upper half of the secondary 60 of a transformer 61 having a primary winding 62 connected to any suitable power source. The slider 53 is connected to the upper end of a potentiometer or voltage divider 63 and the lower end of this potentiometer is connected to the slider of another potentiometer 64 and one end of the potentiometer 64 connects to the lower end of the secondary 60 of transformer 61. Numeral 65 designates another potentiometer which is connected across the secondary 60 of transformer 61 through the potentiometer 64. From the foregoing it will be seen that the slider of potentiometer 64 is in series with the resistance of potentiometer 63. Potentiometer 65 is in series with the resistance of potentiometer 64 across secondary 60. Thus, the voltage drop across the resistance of potentiometer 63 is dependent upon the adjustments of the other potentiometers. The voltage at the upper end of the resistance of potentiometer 63 depends on the position of slider 53 relative to resistance 52. The potential at the lower end of the resistance of potentiometer 63 is dependent upon the setting of potentiometer 64 since this potentiometer has its slider in series therewith, and it is dependent upon the setting of potentiometer 65 which is a vernier for potentiometer 64.

The slider of potentiometer 63 connects to the primary 67 of a transformer 68 having a secondary 69 and the other terminal of the primary 67 is connected to the lower end of the resistance of potentiometer 63. Numeral 70 designates a condenser connected across the primary 67 of transformer 68. Thus, the voltage impressed across the primary 67 of transformer 68 depends on the setting of the slider of potentiometer 63 and also upon the setting of the other potentiometers 53, 64, and 65. The voltage output of the transformer 68 is impressed on a control device 71 which is any suitable type of electronic control device which produces an electrical output proportional to the voltage signal impressed thereon, and this control device may preferably include the device known as the Reactrol manufactured by the General Electric Company. The control device 71 controls the amount of power supplied to the primary 17 of transformer 16 and consequently the amount of power supplied by its secondary 18 to the electrical heater 12 associated with container 10.

Potentiometer 63 adjusts the "band width" of the system; (i. e.) it is for adjusting for the amount of temperature change required to change the power supplied through its range from minimum to maximum or vice versa. Thus when the slider of potentiometer 63 is farther down on the resistance a change in voltage drop across the resistance will cause a bigger change in the signal impressed on transformer 68 than when the slider of potentiometer 63 is higher up on the resistance. In this manner the differential of the system may be adjusted.

The slider 53 may be set adjacent the scale 54 opposite any desired temperature and this, of course, changes its position relative to the slide wire resistance 52. The rack 51 is mechanically connected to another pointer 75 which moves adjacent scale 54 whenever the pinion 50 adjusts rack 51 and the slide wire resistance 52. The pointer 75 is an indicator of the temperature sensed by the hot wire resistor 20. The pointer 75 is physically opposite the mid-point of resistance 52.

Numeral 77 designates a voltmeter connected between the slider 53 and the right end of slide wire resistance 52. The voltmeter 77 has a scale having a range corresponding substantially to the voltage drop across the resistance 52; thus, when the slider 53 is in mid-position of resistance 52, the voltmeter 77 reads at mid-scale and whenever the slider 53 is off center of resistance 52, the voltmeter 77 deflects a proportional amount. The voltmeter 77 is calibrated from 0° to 15° on either side of mid-scale.

With reference to the operation of the system, the slider 53 as shown is set opposite the scale 54 for the temperature which is desired in container 10, which is 530° (for example), and the actual temperature is at this value. Our invention contemplates having slider 53 set for this temperature. The system is then stabilized and a voltage signal is being taken off the potentiometer 63 and impressed on the transformer 67, and the control device 71 of just sufficient magnitude so that the transformer 16 supplies the required amount of heat to maintain the desired temperature. In the event of a change of temperature in the container 10, the impedance of hot wire resistor 20 will change and the flow of current through the secondary 22 of transformer 21 will be changed. The voltage across the primary 23 of transformer 21 will be changed and will unbalance the bridge 25 which previously was balanced. This will cause the galvanometer to deflect, and then each time the jaws clamp its pointer 46, the feeler structure 47 will receive an impulse which will influence the motor mechanism of 25 to actuate the shafts 48 and 49. Rotation of shaft 48 will actuate pinion 50 and move slide wire resistance 52 to the right or left in a manner to change the voltage drop across potentiometer 63 and to thus vary the signal impressed on the control device 71, which, in turn, will change the amount of power supplied in a manner to cause the temperature to tend to go back toward the desired value. Actuation of shaft 49 will, through pinion 55, actuate the rack 56 which will move the slider 31 to right or left adjacent the slide wire 30 and in a direction to rebalance the bridge 25; thus the effect of a change of temperature in container 10 from the desired value is to unbalance the bridge 25 and to cause the amount of heating to be changed in a direction tending to return the temperature to the desired value and also to operate the slider 31 to rebalance the bridge 25. Bridge 25 (and galvanometer 41) will rebalance within a few seconds. As the hot wire resistor 20 begins to sense the trend of the temperature back toward the desired value, the hot wire resistor 20 will change the voltage across the primary 23 of transformer 21 and the bridge 25 will now unbalance in the opposite direction as will galvanometer 41. The mechanisms will now operate in reverse manner, and potentiometer 52 will be operated in a direction to remove the change which was initially made therein. As long as the temperature continues changing back toward the desired value galvanometer 41 will be unbalanced in the opposite direction, all the time operating slider 31 to rebalance itself. The amount of unbalance will be small, and by the time the temperature has reached its original normal value, the bridge 25 will normally be rebalanced as will be the galvanometer 41, the original change which was made in the position of resistance 52 now having been removed and the system rebalanced and re-established at the desired temperature setting.

When starting up a system from cold, or when it is desired to manually reset the system for a new temperature, say for example a higher temperature in chamber 10, pointer 53 is set to the desired temperature opposite the scale 54. This changes the position of slider 53 relative to resistance 52 so as to change the voltage drop across the resistance 63. This changes the signal to device 71 and more heat will be supplied at container 10 causing bridge 25 and galvanometer 41 to unbalance and to operate as described above. As the temperature of the chamber 10 rises, pointer 75 will move along scale 54 toward the pointer 53. If the heaters are supplying insufficient heat to bring the pointer 75 up to matching position with pointer 53, the amount of heat is increased by adjusting the potentiometers 64 and 65. By adjusting potentiometer 64, (and its vernier 65) the voltage across potentiometer 63 is varied, and thus in bringing the system up to the desired temperature, pointers 53 and 75 can be matched by adjusting these potentiometers. Potentiometers 64 and 65 serves to determine the amount of power supplied when slider 53 is at the midpoint of resistance 52.

As pointed out above, the resistances 42 and 43 are located at a remote point, so that the bridge 25 can be manually unbalanced by means of adjusting them. Thus, if it is desired to adjust the temperature at a remote point, that is, remote from the position occupied by adjusting mechanism including the slider 53, part of the resistance 42 (and/or resistance 43) may be inserted in the leg of the bridge having condenser 29 and the result will be the same as if the temperature had deviated at container 10, the pointer 75 moving away from the pointer 53 with resistance 52 moving so as to change the heating in a direction to change the temperature to the new value desired. Thus if slider 39 is moved one step, an amount of resistance is inserted equivalent to a 10° change of temperature. Mechanism 45 will operate to cause pointer 75 (and resistance 52) to move so that pointer 75 is opposite 520° on scale 54. Voltmeter 77 will deflect indicating −10° thus showing that slider 53 is off center by an amount equalling 10° and that this amount is below the setting of slider 53. As the temperature starts to change to the new value, galvanometer 41 will deflect in the opposite direction as described above and resistance 52 will be actuated in a direction to remove the original change made therein. Pointer 75 will work back toward pointer 53 and will again match itself with pointer 53, the voltmeter 77 going back to mid-scale indicating matching of slider 53 with pointer 75. Pointer 75 will not now be indicating the true temperature but the operator will know the temperature from the setting of slider 39 and the knowledge that voltmeter 77 is at mid-scale.

If the operator wishes to change the temperature in one degree increments slider 44 is adjusted adjacent resistance 43. Thus when the operator desires to set for a new temperature from the remote point, voltmeter 77 indicates how much the actual temperature is away from the desired new setting, and when it reaches midscale, the temperature is of course that indicated by the settings of sliders 39 and 44.

From the foregoing those skilled in the art will observe that we have provided a convenient and effective arrangement for remotely controlling the temperature and providing an indication thereof.

The embodiment of my invention disclosed herein is representative of its preferred form. The disclosure is to be interpreted in an illustrative rather than a limiting sense, the scope of the invention being determined in accordance with the claims appended hereto.

We claim:

1. In a temperature control system, in combination, means comprising a bridge circuit arranged to be balanced and unbalanced in response to the temperature being controlled, means comprising a potentiometer having a slide wire and a slider adjustable relative thereto, the potentiometer having a predetermined voltage drop thereacross and being automatically adjustable in response to balance and unbalance of the bridge circuit, means for controlling the system from a remote point comprising a device for unbalancing the bridge amounts equivalent to predetermined temperature changes and means for indicating the relative positions of the slider and slide-wire comprising a voltmeter connected between the slider of the potentiometer and one end of the slide wire, the calibrations of the voltmeter being such as to indicate the amount that the actual temperature is away from the desired temperature.

2. In a control system for controlling a condition such as temperature or the like, in combination, control apparatus including a bridge circuit and means for unbalancing the bridge in response to deviations of the condition being controlled from a desired value, said apparatus including automatic means for rebalancing the bridge irrespective of the condition, means responsive to unbalance of the bridge comprising a control potentiometer having a slider and slidewire arranged to be relatively adjusted when the bridge is unbalanced in response to deviation of the condition, the slider and slide-wire normally reassuming predetermined relative positions when the condition becomes normal after a deviation, remotely located means for unbalancing the bridge in a manner to cause the apparatus to operate to change the value of the condition to a predetermined new desired value, and means at the remote point comprising a voltmeter connected between the slider and a part of the slidewire to indicate the relative positions of the slider and slidewire and to thereby indicate when the condition is at the desired value and the amount by which it is away from the desired value when it is not at the desired value.

References Cited in the file of this patent

UNITED STATES PATENTS

| | | |
|---|---|---|
| 1,361,676 | Brewer | Dec. 7, 1920 |
| 1,376,633 | Obermaier | May 3, 1921 |
| 2,025,542 | Lugar | Dec. 24, 1935 |
| 2,160,400 | Cunningham | May 30, 1939 |

FOREIGN PATENTS

| | | |
|---|---|---|
| 370,533 | Great Britain | Apr. 14, 1932 |